United States Patent [19]
Caldwell et al.

[11] Patent Number: 4,532,159
[45] Date of Patent: Jul. 30, 1985

[54] FLASH-RUST PROTECTING OF FERROUS SUBSTRATE

[75] Inventors: David Caldwell, Sale, England; David Miller, Buckley, Wales; John C. Padget, Frodsham, England

[73] Assignee: Imperial Chemical Industries PLC, London, England

[21] Appl. No.: 242,522

[22] Filed: Mar. 11, 1981

Related U.S. Application Data

[63] Continuation-in-part of Ser. No. 224,450, Jan. 12, 1981, abandoned.

[30] Foreign Application Priority Data

Feb. 1, 1980 [GB] United Kingdom ............... 8003459

[51] Int. Cl.$^3$ ............................................. B05D 3/02
[52] U.S. Cl. ........................... 427/388.4; 427/388.1; 427/388.2; 524/556
[58] Field of Search ............. 427/388.4, 388.2, 388.1; 260/29.6 RW, 29.6 RB, 29.6 T, 29.6 TA, 29.6 H, 29.6 M

[56] References Cited

U.S. PATENT DOCUMENTS 2,873,215  2/1959  Quigley, Jr. et al. ........ 427/388.4 X
4,103,049  7/1978  Nishida et al. ................... 427/388.4
4,103,050  7/1978  Laskin et al. ................. 427/388.4 X
4,238,535 12/1980  Talsma et al. .................... 427/388.4

FOREIGN PATENT DOCUMENTS 0212859  4/1941  Switzerland .
0826564  1/1960  United Kingdom .
1099152  1/1968  United Kingdom .
1253080 11/1971  United Kingdom .
4150916  9/1976  United Kingdom .
1494212 12/1977  United Kingdom .
1562651  3/1980  United Kingdom .

Primary Examiner—Thurman K. Page
Attorney, Agent, or Firm—Cushman, Darby & Cushman

[57] ABSTRACT

In the protection of ferrous substrates by application of a water-based paint composition followed by drying at ambient temperature susceptibility to flash rusting is reduced by the use of a paint composition having pH in the range from 4.0 to 6.5.

8 Claims, No Drawings

FLASH-RUST PROTECTING OF FERROUS SUBSTRATE

This application is a continuation-in-part of application Ser. No.224,450 filed Jan. 12, 1981, and now abandoned.

This invention relates to water-based coating compositions and more particularly to water-based coating compositions comprising an aqueous latex or dispersion of a film-forming polymer, and the use thereof in providing protective coatings upon ferrous metal surfaces.

A wide variety of polymers (both homopolymers and copolymers) may be used as the film-forming polymer component (the "polymeric binder") in water-based coating compositions for use in the protective coating of ferrous metal surfaces. Such coating compositions comprise (a) an aqueous latex or dispersion of the polymeric binder,
(b) one or more pigments and (c) optionally one or more other components, for example thickeners.

A problem that is often encountered with water-based coating compositions when used in the protection of iron or steel is that known as "flash-rusting"; this term is applied to the development of small discrete areas of rust staining as the applied coating dries. The problem of flash-rusting is especially troublesome when the drying of the applied coating takes place at ambient temperature, i.e. with compositions which do not require a "baking" period for curing or hardening at a temperature substantially above ambient temperature. Since much of the potential use of protective coating compositions is in their application to structures such as bridges, buildings and storage tanks and large components such as pipe-work, it is clearly desirable that such coating compositions should be capable of being applied by brush, spray or roller and of being dried at ambient temperature without the need for curing at elevated temperature. (This is in contrast to the application of paints by dipping processes or by processes wherein an article or component is immersed in a bath from which the coating is deposited; in such processes the applied coating can readily be dried in a controlled atmosphere, usually with "baking" or curing at elevated temperature).

In the formulation of water-based paints capable of drying at ambient temperature it has previously been regarded as essential, in order to minimise flash-rusting, to use an alkaline composition, the pH being adjusted to above 7, if necessary, by the addition of a base, for example ammonium hydroxide or morpholine. Thus, for example, in the specification of UK Pat. No. 1 450 916 there is described a pigmented corrosion-inhibiting composition containing a water-soluble complex of a polyvalent transition metal with a volatile complexing agent (which may be ammonia or a volatile amine) and a corrosion-inhibiting anion. In the formulation of a water-based paint comprising an aqueous polymer latex, the said water-soluble complex, pigments and other paint components, ammonium hydroxide is added to bring the pH to a value of 7.5 to 10.

We have now found that, for a wide variety of polymeric binders, water-based coating compositions capable of being applied and dried at ambient temperature and having low susceptibility to flash-rusting may be obtained (without impairing long-term resistance to corrosion) by formulation to give an acidic composition.

Thus according to the present invention there is provided a water-based paint composition capable of forming a protective coating by application to a ferrous substrate followed by drying at ambient temperature comprising (a) an aqueous latex or dispersion of a film-forming polymer consisting essentially of units derived from one or more mono-ethylenically unsaturated monomers containing a single vinyl or vinylidene group and (b) a corrosion-inhibiting pigment, characterized in that the pH of the composition is in the range from 4.0 to 6.5.

According to another aspect of the invention there is provided a method of protecting a ferrous substrate which comprises applying to the said substrate a coating of a water-based paint composition as defined in the preceding paragraph.

The polymers which may be used as the film-forming polymer (the "polymeric binder") in the aqueous latex used in the present invention include homopolymers and copolymers of the following:

vinyl chloride vinylidene chloride vinyl esters of alkanoic acids having from 1 to 18 carbon atoms in the alkyl group, especially vinyl acetate.

acrylic and methacrylic esters of alkanoic acids having from 1 to 18 carbon atoms in the alkyl group, especially the said esters having from 1 to 12 carbon atoms in the alkyl group, for example the methyl, butyl or 2-ethylhexyl esters.

acrylonitrile, methacrylonitrile mono-ethylenically unsaturated hydrocarbons, for example ethylene, isobutene, styrene and alpha-methyl styrene.

The polymers may also (optionally) contain a small proportion of one or more aliphatic alpha-beta unsaturated carboxylic acids. The proportion of such acid(s) may be, for example, from 0.2 parts to 10 parts by weight per hundred parts of the total monomer components of the polymer. Acids which may be used include acrylic, methacrylic, itaconic and citraconic acids.

The present invention is especially advantageous when the polymer in the aqueous latex is a copolymer of (i) vinyl chloride, (ii) vinylidene chloride and (iii) one or more alkyl acrylates or alkyl methacrylates having from 1 to 12 carbon atoms in the alkyl group; such polymers may optionally also contain one or more aliphatic alpha-beta unsaturated carboxylic acids. Examples of such copolymers are those described generally and specifically in the specification of our UK Pat. No. 1 558 411.

The preparation of the aqueous latex of the polymer may be carried out by well-established emulsion polymerisation techniques, for example as described in UK Pat. No. 1 558 411 and in UK Pat. No. 1 450 916. Alternatively, the latex may be prepared by emulsification of a polymer prepared by another polymerization technique.

The required pH range may be achieved by using a method of polymerization which leads directly to an aqueous latex having a pH value in the required range; alternatively the pH of the aqueous latex, as prepared, may be above or below the required range, the pH subsequently being adjusted to the required value by appropriate addition of acid or alkali.

The optimum pH for a particular paint composition will depend upon the corrosion-inhibiting pigment employed. In general the preferred pH is in the range from 4.0 to 5.5, for example from 4.0 to 5.0.

The corrosion-inhibiting pigment may be a metal salt derived from a wide range of oxy-acids. The anion thereof may be, for example, an oxy-anion containing chromium, molybdenum, tungsten, phosphorus, boron or silicon; such anions include chromate, molybdate, tungstate, silicochromate, metaborate, hexametaphosphate, acid phosphate, silicate, phosphosilicate and borosilicate.

The metal of the salt may be, for example, zinc, lead, magnesium, manganese, iron, calcium, strontium or barium; an especially suitable pigment is zinc phosphate.

In addition to the corrosion-inhibiting pigment the paint composition may advantageously also contain corrosion-inhibiting anions introduced in the form of the corresponding acid or a water-soluble salt thereof. The anions thus introduced further enhance resistance to flash rusting and in many cases improved adhesion of the coating to the metal substrate results. Introduction of the said anions in the form of the corresponding acid is especially advantageous when the latex as prepared is alkaline and/or when a basic pigment is used. Suitable anions which may be introduced in this way include those already mentioned as anions of the corrosion-inhibiting pigment. The use of phosphate anions is especially preferred; other suitable anions include ferrocyanide, ferricyanide and corrosion-inhibiting organic anions, for example benzoate.

The compositions of the invention may be applied to a wide variety of ferrous substrates, for example clean or rusty steel which has been blasted by steel shot or by other means, rusty steel or wire-brushed rusty steel. The compositions may be applied by conventional techniques for the application of a coating to a substrate, for example by brush, spray or roller. For such applications the solids content of the paint composition is preferably at least 25% by volume (for example from 25% to 60%, preferably from 35% to 50%).

The invention is illustrated by the following Examples. Unless otherwise stated all parts and percentages are by weight.

EXAMPLE 1

An aqueous latex of a copolymer of vinylidene chloride, vinyl chloride, 2-ethylhexyl acrylate and acrylic acid was prepared by the method described in the specification of UK Pat. No. 1 588 411.

The copolymer contained 76 parts of vinylidene chloride, 6.5 parts of 2-ethylhexyl acrylate and 2 parts of acrylic acid per hundred parts of total vinylidene chloride and vinyl chloride. The solids content of the latex was 61% and the pH as prepared was 2.0.

This latex was mixed with minor proportions of surfactant and defoamer to give Latex Mixture A of the following composition:

|  | parts |  |
|---|---|---|
| Aqueous latex (61% solids) | 59.2 |  |
| "Synperonic" PE 39/70 (30% solution) | 2.4 | (surfactant) |
| "Bevaloid" 642 | 0.1 | (defoamer) |
| Butyl cellosolve | 2.0 |  |

A pigment dispersion containing zinc phosphate as corrosion-inhibiting pigment was prepared (using a high-speed cavitation mixer) having the following composition:

|  | parts |
|---|---|
| "Synperonic" PE 39/70 (30% solution) | 19.6 |
| "Bevaloid" 642 | 2.8 |
| "Methocel" J12MS | 5.6 |
| Zinc phosphate PZ40 | 160 |
| Micronized barytes | 456 |
| "Tioxide" RCR2 | 67.2 |
| Water | 300 |

A paint composition was prepared by mixing 36.2 parts of this pigment dispersion with 63.7 parts of Latex Mixture A using low speed stirring. The pH of the resultant paint was 4.0.

A sample of the paint was applied by brush to a shot-blasted mild steel panel at a wet film thickness of 50 microns. The coated panel was dried at 22° C. (relative humidity 85%) for 4 hours and then assessed for flash rusting on a scale from 1 to 10, where 1 represents no flash rusting and 10 represents very extensive flash rusting. The degree of flash rusting was assessed as 3.

The pH of another portion of the paint was adjusted to pH 5.0 by addition of 0.880 ammonia; this paint was applied to a steel panel and the flash rusting assessed after the same procedure; the degree of flash rusting was 5.

By way of comparison, the pH of another portion of the paint was adjusted to pH 8.0; after the same procedure the degree of flash rusting was 10.

EXAMPLE 2

A paint was prepared as described in Example 1, except that the zinc phosphate used as corrosion-inhibiting pigment in Example 1 was replaced by strontium chromate on an equal volume basis. The pH of the paint as prepared was 4.3.

The pH of one portion of the paint was adjusted to pH 5.0 by addition of ammonia; this paint was then applied to a steel panel and the flash rusting was assessed as described in Example 1. The degree of flash rusting was 4.

By way of comparison, the pH of another portion of the paint was adjusted to pH 8.0 by addition of ammonia. Following the procedure described in Example 1 the degree of flash rusting of a painted steel panel was 8.

EXAMPLE 3

A paint was prepared as described in Example 1, except that the zinc phosphate was replaced by barium metaborate on an equal volume basis. The pH of the paint as prepared was 7.2.

The pH of one portion of the paint was adjusted to pH 5.0 by addition of 50% aqueous sulphuric acid; following the procedure described in Example 1 the degree of flash rusting of a painted steel panel was 2.

The pH of another portion of the paint was adjusted to pH 6.0; the degree of flash rusting was again 2.

By way of comparison, the pH of another portion of the paint was adjusted to pH 8.0 by addition of ammonia; the corresponding degree of flash rusting was 5.

EXAMPLE 4

A paint was prepared as follows from "Vinacryl" 7175, a styrene-acrylic copolymer aqueous latex marketed by Vinyl Products Limited. The latex was mixed with minor proportions of surfactant and defoamer to give latex Mixture B of the following composition:

|  | parts |
|---|---|
| Aqueous latex | 75.6 |
| "Foamaster" NS | 0.1 |
| Butyl Cellosolve | 2.0 |
| "Synperonic" PE 39/70 | 4.6 |

A pigment dispersion containing zinc phosphate as corrosion-inhibiting pigment was prepared having the following composition:

|  | parts |
|---|---|
| Water | 720 |
| "Foamaster" NS | 7.5 |
| "Methocel" J12 MS | 15 |
| "Synperonic" PE 39/70 (30% solution) | 75 |
| Zinc phosphate PZ40 | 427 |
| Micronized barytes | 1217 |
| "Tioxide" RCR2 | 181 |

A paint composition was prepared by mixing 35.3 parts of this pigment dispersion with 82.3 parts of Latex Mixture B using low-speed stirring. The pH of the resultant paint was 8.0.

One portion of the paint was acidified to pH 4.5 by addition of 50% aqueous sulphuric acid; following the procedure described in Example 1 the degree of flash rusting of a painted steel panel was 3.

By way of comparison, another portion of the paint was used as prepared at pH 8.0; the corresponding degree of flash rusting was 8.

EXAMPLE 5

A paint was prepared as described in Example 4, except that the "Vinacryl" 7175 was replaced by "Ucar" 4341, a styrene-acrylic latex marketed by Union Carbide Inc.

One portion of the paint was acidified to pH 4.5; the corresponding degree of flash rusting was 4.

By way of comparison, another portion of the paint was used as prepared at pH 8; the corresponding degree of flash rusting was 8.

EXAMPLE 6

A paint was prepared as described in Example 1 except that orthophosphoric acid (1.0 g) was added as a solution in water (50% by weight) to Latex Mixture A. The pH of the paint was adjusted to pH 6.0 by addition of ammonia. The degree of flash rusting was 2.

EXAMPLE 7

A paint was prepared as described in Example 6 except that the orthophosphoric acid was replaced by the same weight of diammonium hydrogen phosphate. The pH of the paint was adjusted to pH 6.0 by addition of ammonia. The degree of flash rusting was again 2.

In the foregoing Examples the solids contents of the paint compositions were as follows:

| Example | % solids by weight | % solids by volume |
|---|---|---|
| 1 | 62 | 44 |
| 2 | 63 | 44 |
| 3 | 62.5 | 44 |
| 4 | 54 | 39 |
| 5 | 54 | 39 |
| 6 | 54 | 39 |

We claim:

1. A method of protecting a ferrous substrate by application of a coating having low susceptibility to flash-rusting which comprises (a) applying to the said substrate by brushing, spraying or roller a coating of a water-based paint composition consisting essentially of (i) an aqueous latex of a film-forming polymer consisting essentially of units derived from one or more monoethylenically unsaturated monomers containing a single vinyl or vinylidene group and (ii) a corrosion-inhibiting pigment, the pH of the composition being in the range of from 4.0 to 6.5; and (b) allowing the applied coating to dry at ambient temperature and without any subsequent baking or curing at elevated temperature.

2. A method according to claim 1, wherein the pH is in the range from 4.0 to 5.5.

3. A method according to claim 1, wherein the film-forming polymer is a copolymer of (i) vinyl chloride, (ii) vinylidene chloride and (iii) one or more alkyl acrylates or alkyl methacrylates having from 1 to 12 carbon atoms in the alkyl group.

4. A method according to claim 1, wherein the corrosion-inhibiting pigment is a metal salt of an inorganic oxy-acid.

5. A method according to claim 4, wherein the metal of the salt is zinc, lead, magnesium, manganese, iron, calcium strontium or barium.

6. A method according to claim 1, wherein the corrosion-inhibiting pigment zinc phosphate.

7. A method according to claim 1, wherein the composition also contains corrosion-inhibiting anions introduced in the form of the corresponding acid or a water-soluble salt thereof.

8. A method according to claim 1, wherein the solids content is at least 25% by volume.

* * * * *